Sept. 21, 1943.    M. B. CAMERON    2,329,743
LOCKING DEVICE FOR CLUTCH CONTROL MECHANISM
Filed March 29, 1941
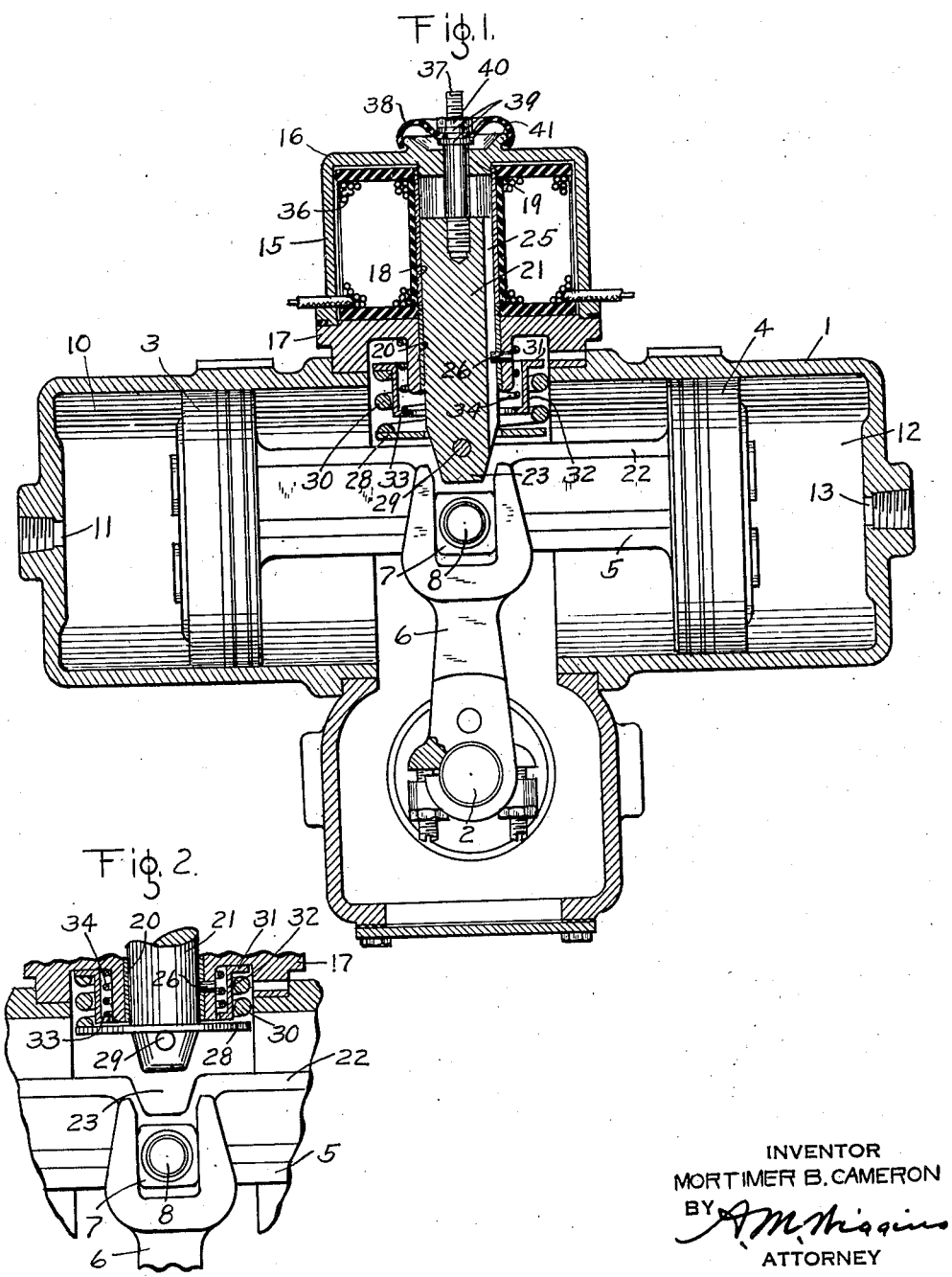
INVENTOR
MORTIMER B. CAMERON
BY
ATTORNEY Patented Sept. 21, 1943

2,329,743

UNITED STATES PATENT OFFICE 2,329,743

LOCKING DEVICE FOR CLUTCH CONTROL MECHANISMS

Mortimer B. Cameron, Edgewood, Pa., assignor to The Westinghouse Air Brake Company, Wilmerding, Pa., a corporation of Pennsylvania Application March 29, 1941, Serial No. 385,873

2 Claims. (Cl. 188—171)

This invention relates to clutch control mechanisms and more particularly to means for defining a chosen position of the shifting means of such a mechanism and for securing said shifting means therein.

In my copending application Serial No. 347,822, filed July 27, 1940, Patent No. 2,279,365, April 14, 1942, there is disclosed a clutch control mechanism embodying a motor which is operative by fluid under pressure to selectively position a clutch in either one or the other of two drive positions or in a neutral non-operating position. To move the clutch to one of its drive positions piston means in the motor is moved by fluid under pressure to one extreme position. To move the clutch to the other drive position the piston means is moved by fluid under pressure to an opposite extreme position. To neutralize the clutch the motor piston means is movable by fluid under pressure from either of its extreme positions in the direction of the other and a latch is arranged to arrest such movement in a neutral position between the two extreme positions.

The latch or locking means disclosed in the above mentioned copending application comprises an electromagnet armature which when the electro-magnet is deenergized is movable by spring pressure into locking relation with the motor piston means when in neutral position for thereby securing the clutch in its neutral or non-operating position. Energization of the electromagnet is adapted to release the armature from the motor piston means to provide for operation of the motor to shift the clutch to its different drive positions. The motor release position of the armature is defined by engagement with a stop which in practice is a part of the magnet casing and it has been found that in moving to such position the armature strikes the stop with a force which is liable to cause rupture of said casing. This is due to the well-known fact that the magnetic pull on the armature increases very rapidly as the air gap between the armature and its stop against the casing reduces, so that at the time the release position is reached a relatively great and possibly destructive force is obtained.

The principal object of the present invention is the provision of an electromagnet structure embodying novel means for obviating the objectionable characteristic just described.

Other objects and advantages will be apparent from the following more detailed description of the invention.

In the accompanying drawing:

Fig. 1 is a cross-sectional view through a clutch shifting motor and a locking magnet device embodying the invention; and Fig. 2 is a view similar to a portion of Fig. 1 but showing the locking magnet armature in its motor releasing position.

As shown in the drawing, the clutch shifting motor employed for the purpose of illustrating one use of the invention, comprises a casing 1 which is adapted to be mounted on or otherwise intimately associated with the housing (not shown) of a three-position clutch which is adapted to be moved to its different positions through the medium of a rock shaft 2 extending into the casing 1. The casing contains two oppositely disposed reciprocating pistons 3 and 4 which are spaced apart and connected together by a rod 5. A shifting arm 6 has one end secured to the shaft 2 for rocking same. The opposite end of arm 6 is bifurcated and straddles a block 7 which is journaled on a pin 8 secured to the piston rod 5 intermediate the ends thereof.

The piston 3 has at its outer face a chamber 10 adapted to be connected to a pipe through an opening 11, while the piston 4 has at its opposite face a chamber 12 adapted to be connected to a different pipe through an opening 13. In use, fluid under pressure is adapted to be supplied to one of these chambers, only when the other is vented. Thus when fluid under pressure is supplied to chamber 10 to act on piston 3, said piston is adapted to move toward the right-hand until piston 4 contacts one end of the casing for thereby rocking the arm 6 and shaft 2 in a clockwise direction to move the clutch to one of its drive positions. When fluid under pressure is supplied to the piston chamber 12 to act on piston 4, said piston is adapted to move toward the left hand until piston 3 contacts the opposite end of the casing for rocking the arm 6 and shaft 2 in a counterclockwise direction to move the clutch to its other driving position.

In order to arrest movement of the pistons 3 and 4 and thereby of arm 6 and rock shaft 2 in the neutral position shown for thereby positioning the clutch in its neutral or non-driving position, a magnet device 15 is associated with the casing 1.

The magnet device 15 comprises an inverted cup-shaped section 16 having its open end mounted against a base member 17 which in turn is secured to the motor casing 1. The cup-shaped section 16 carries a sleeve 18 having one end secured to a boss 19 projecting inwardly from the closed end of the section, while the other end of the sleeve engages the end of a shorter sleeve 20 disposed in coaxial relation in the base member 7 and having its lower end opening over the top of the piston rod 5. Both of these sleeves are made of non-magnetic material, such as brass, and slidably mounted in the sleeves is a magnet armature 21.

Directly below the end of the armature 21 the piston rod 5 is provided with a rib 22 extending longitudinally thereof between the pistons 3 and 4. Intermediate the ends of this rib is a notch 23 adapted to receive the end of the armature 21 when the two pistons 3 and 4, arm 6 and shaft 2 are in their neutral positions shown. The end of the armature entering the notch 23 is tapered and the opposite sides of said notch adapted to be engaged by the armature are formed at corresponding angles in order to provide a contact without lost motion between said armature and the rib 22.

The armature is provided in one side with a longitudinally extending slot 25 and carried by the base member 17 and extending into said slot is a pin 26. The armature is adapted to move relative to pin 26 in operation and said pin is adapted to maintain the lower tapered end of the armature in alignment for entering the notch 23 in the piston rod rib 22.

A washer 28 encircles the armature 21 above the piston rod rib 22 and is supported on a pin 29 secured to the armature. This washer constitutes a seat for one end of a buffer spring 30 the opposite end of which engages an out-turned annular flange 31 of a sleeve 32 which is contained within the upper end coils of said spring. The sleeve 32 has at its lower end an in-turned annular flange 33 which supports one end of a relatively light spring 34 the opposite end of which bears against the base member 17.

Contained in the cup-shaped casing 16 is a magnet operating coil 36. When this coil is deenergized the magnet armature 21 is adapted to be forced downwardly into engagement with the top of the rib 22 or into the notch 23 by the pressure of the relatively light release spring 34 transmitted through the sleeve 32 and buffer spring 30 to the spring seat or washer 28. The buffer spring 30 having greater compressive force than spring 34 merely acts in effect under this condition like a solid connection between the lighter spring 34 and washer 28 and may therefore be expanded to substantially its free height.

When the magnet coil 36 is energized the magnetic attraction between the upper end of the armature 21 and boss 19 extending into the sleeve 18 causes the armature 21 to move upwardly and away from the piston stem rib 22. During the initial portion of this movement the washer 28 and buffer spring 30 merely move with the armature against the opposing force of the relatively light spring 34 which determines the degree of magnetic force required to effect such movement. However, at substantially the time the end of the armature moves out of notch 23 in the piston stem rib 22, at which time the air gap between the opposite end of the armature and boss 19 is reduced to a degree which provides a much greater magnetic pull on the armature than initially existed, the flange 31 on sleeve 32 contacts the base member 17 so that further upward movement of the armature will be opposed by the relatively high pressure of the buffer spring 30. The spring 30 is adapted to substantially counter-act this increased magnetic pull on the armature 21 and to absorb a material amount of the inertia of the armature resulting from its initial movement against the light spring 34, whereby the movement of the armature will be slowed down during the remainder of its stroke into contact with the boss 19 which constitutes a release stop for the armature.

It will be apparent that the relatively light spring 34 which opposes the initial movement of the armature provides for prompt release of the armature from the piston rod rib 22 upon energization of the magnet. The buffer spring 30 then becomes effective to snub the armature so that the force with which it strikes against the boss 19 will be of such a low degree as not to cause damage to the magnet housing.

When the magnet coil 36 is again deenergized the buffer spring 30 will initially act to start the armature 21 moving away from the boss 19, but its action is limited to substantially its free height of expansion shown in the drawing, after which further movement of the armature is dependent upon the force of the relatively light spring 34.

To permit operation of the clutch shifting motor the magnet coil 36 is adapted to be energized for releasing the armature 21 from the piston stem rib 22 in order to permit the pistons 3 or 4 to be operated by fluid under pressure for shifting the clutch to either one or the other of its driving positions. When it is desired to move the clutch from either of its driving positions to its neutral or non-operating position, the magnet coil 36 is deenergized at substantially the time fluid under pressure is supplied to the proper piston chamber 10 or 12. As a result, the armature 21 will be urged downwardly against the piston rod rib 22 by the spring 34 so that when the notch 23 in the rib moves into alignment with the end of the armature, as the pistons are moved in either one direction or the other, said armature will be forced into said notch by spring 34 and thereby arrest the pistons in their neutral position shown for thereby neutralizing the clutch controlled thereby. When it is subsequently desired to move the clutch to a driving position the magnet coil 36 must be energized to withdraw the armature 21 from the notch 23, as will be apparent.

An inspection of the drawing will show that the buffer spring 30 becomes effective just prior to the end of the armature clearing the upper surface of the piston rod rib 22. This is due to the fact that it is difficult to provide in the limited space available a buffer spring having the desired characteristics. However, this does not work to the disadvantage of the device in any respect and is not objectionable, since it will be noted that the buffer spring at the time of contact with the base member 17 is substantially at its free height and therefore does not provide initially an excessive force to oppose the slight further movement of the armature to clear the rib 22. Furthermore, the inertia of the armature 21 at this time is sufficient to offset to a certain degree the initial opposing force of the buffer spring 30 and it has been found that the armature 21 will promptly clear the piston rod rib 22 to permit the desired operation of the motor.

A rod 37 having one end secured to the upper end of the armature 21 extends through a suitable bore in the boss 19 and upper closed end of the magnet casing section 16 to the exterior of said casing. A boot 38 is mounted over the outer end of the rod 37 and clamped thereto between two washers 39 by a nut 40. The outer edge of this boot is contracted around a rib 41 on the casing section 16. This boot is provided to exclude foreign matter from the bearing between the rod and casing section 16 and thereby from the interior of the magnet device.

The outer end of the rod 37 is provided with screw threads to which a manually operated puller (not shown) is adapted to be applied. Thus, in case of failure of the supply of electric current for energizing the magnet, the armature 21 may be pulled manually out of the notch 23 in the piston rod rib 22 so that by a hand lever (not shown) the clutch may be shifted manually to any one of its different positions. By this arrangement an operator can move the vehicle to a terminal or the like for repair.

Summary

From the above description it will now be apparent than an arrangement has been provided for counteracting magnetic pull on the armature of a magnet after a certain degree of movement thereof and to absorb a portion of the inertia of the armature resulting from its initial movement so as to thereby minimize the shock of contact between the armature and its stop. The improved armature snubbing arrangement has no effect upon movement of the armature through a desired degree of travel when the magnet is energized, so that the armature will be just as responsive to provide a desired result as without said arrangement. It will further be apparent that the invention is not limited in use to a clutch shifting motor.

Having now described my invention, what I claim as new and desire to secure by Letters Patent, is:

1. A magnet device comprising a movable armature movable in one direction upon energization of said magnet device and spring means for opposing such movement comprising a relatively light spring having a certain compressive force, a heavier spring having a greater compressive force, means connecting said springs in series to said armature for rendering the first named spring effective to oppose initial movement of said armature upon energization of said magnet device, and means operative after a certain initial movement of said armature to render the first named spring ineffective and the second named spring effective to oppose further movement of said armature.

2. Means for releasably locking a movable member in a chosen position, said member having a notch, and said means comprising a magnet device having a movable armature arranged to enter said notch for securing said member against movement, one spring having a relatively high compressive force bearing at one end on said armature, another spring having a relatively light compressive force and bearing at one end against said magnet device, means operatively connecting the opposite ends of the two springs and so arranged as to render the lighter spring effective to urge said armature into said notch upon deenergization of said magnet device and to oppose movement of said armature out of said notch upon energization of said magnet device, the said means connecting said springs being so arranged as to render the first named spring effective to oppose movement of said armature upon energization of said magnet device at substantially the time said armature moves out of said notch.

MORTIMER B. CAMERON.